A. L. QUILLIN.
TOOL HOLDER.
APPLICATION FILED APR. 12, 1919.
1,317,892.
Patented Oct. 7, 1919.
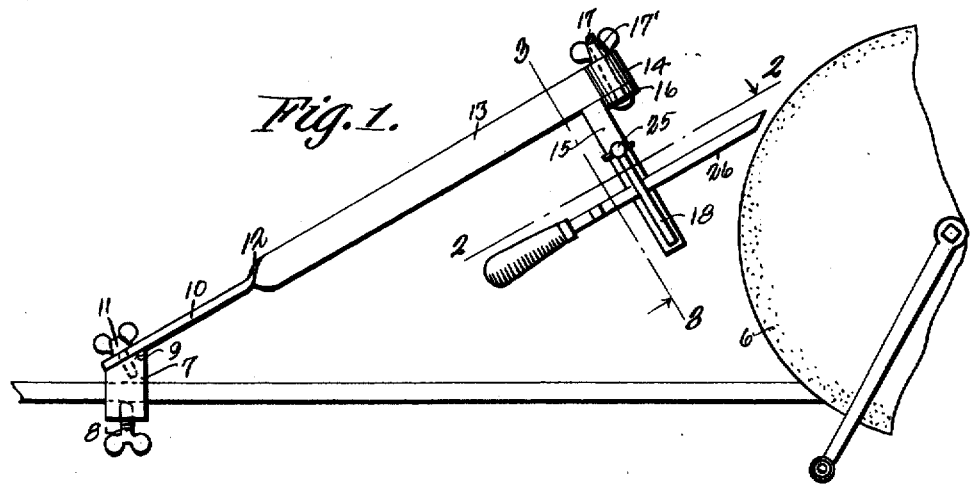
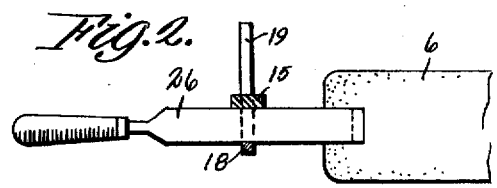
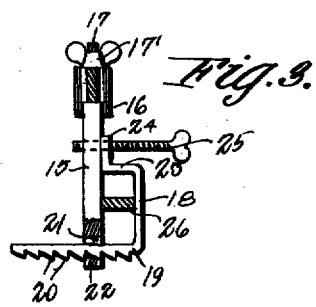
WITNESS:
INVENTOR.
Alphonso L. Quillin
BY
Richard B. Owen
ATTORNEY.

UNITED STATES PATENT OFFICE.

ALPHONSO L. QUILLIN, OF LOCKNEY, TEXAS.

TOOL-HOLDER.

1,317,892.

Specification of Letters Patent.

Patented Oct. 7, 1919.

Application filed April 12, 1919. Serial No. 289,495.

*To all whom it may concern:*

Be it known that I, ALPHONSO L. QUILLIN, a citizen of the United States, residing at Lockney, in the county of Floyd and State of Texas, have invented certain new and useful Improvements in Tool-Holders, of which the following is a specification.

This invention is a tool holder and has for its principal object the production of efficient means for holding a beveled edge tool in position where the same may be easily engaged with an emery wheel for sharpening.

Another object of this invention is the production of a tool holder wherein the supporting elements are adjustably connected together to permit the tool carried thereby to be properly adjusted for bringing the edge thereof into engagement with an emery wheel.

A still further object of this invention is the production of a tool holder wherein a supporting frame is provided, this frame being adapted to have a tool inserted therethrough and to be adjusted for properly clamping and supporting tools of various sizes at a correct angle for sharpening.

One practical form of construction and assembly of the present invention will be hereinafter described and is illustrated in the drawing, in which:—

Figure 1 is a side elevation of the tool holder in use.

Fig. 2 is a section taken on the line 2—2 of Fig. 1.

Fig. 3 is a section taken on the line 3—3 of Fig. 1.

In the preferred embodiment of the present invention, about to be specifically described, it will be seen that the tool holder is herein illustrated in use with a supporting table 5 adjacent which is carried an emery wheel 6. It should be understood that any other suitable support may be employed, as the invention resides in the construction of the tool holder which is intended to be of a simple construction. Therefore it may be conveniently disassembled and carried in a tool bag or wherever desired without occupying a great deal of space, although the same may be readily assembled to perform its function.

A bracket 7 is provided and has a set screw 8 whereby the bracket may be slipped over the edge of the table 5 and the set screw brought into a binding engagement with the table, thus firmly clamping the bracket in a desired position upon the table as shown in Fig. 1. The upper end of the bracket is beveled off at an angle as shown at 9, for purposes to be set forth.

A supporting bar 10 is provided and is formed from a single strip of material as shown in Fig. 1. The lower end of this bar is flat, thus allowing the bar to rest evenly upon the beveled end 9 of the bracket 7. A set screw 11 passes through the lower end of this bar and is carried by the bracket 7 thus holding the bar against displacement. However, it will be noted that the set screw may be loosened to allow the bar to be swung to either side desired and after this action the set screw may again be tightened to again firmly bind the bar upon the upper end of the bracket. Therefore, it is obvious that the bar will be efficiently supported to extend upwardly toward its upper end. This bar is twisted intermediate its ends as shown at 12, thus causing the side surfaces of the bar to extend at right angles to the flat portion 10 adjacent the lower end of the bar. Accordingly the upper end 13 of the bar may be rolled to form a supporting sleeve 14 which extends at an oblique angle to the perpendicular.

The tool supporting frame comprises an arm 15 which is preferably rectangular in cross section to provide broad and flat bearing outer surfaces. An eye 16 is formed on the upper end of the arm 15 projecting at right angles thereto, as shown in Figs. 1 and 3. Accordingly this eye may be placed in engagement with the lower end of the sleeve 14, thus permitting the bolt 17 to be passed therethrough and to pass through the sleeve 14 and carry a binding nut 17' on its upper end. Accordingly when this nut is tightened upon the bolt it is obvious the eye will be held in a binding engagement with the sleeve 14. This action will cause the arm 15 to extend at right angles to the bar, while owing to the manner in which the sleeve 16 is rotatably carried upon the bolt 17 it is obvious that prior to final adjustment, the arm 15 may be moved slightly to one side or the other to obtain the final and correct adjustment.

A clamping yoke 18 is provided and has a base 19 extending at right angles thereto, this base being provided with a plurality of teeth 20 upon its lower surface. This base 19 extends through an opening 21 formed through the lower end portion of the arm 15, it being noted that this arm is provided with a tooth 22 extending into the opening 21 thereof, for engaging a selected tooth 20 of the base 19. A projection 23 extends at right angles to the upper end of the clamping yoke 18 and has a foot 24 extending at right angles thereto. This foot 24 rests evenly upon one surface of the arm 15, while an adjusting screw 25 passes through this foot 24 and is carried by the arm 15. Thus it will be seen that the clamping yoke 18 is adjustably supported upon the arm 15. A chisel or other implement or tool 26 which is to be sharpened may be inserted through the frame by being passed adjacent one surface of the arm 15 and through the clamping yoke 18 as shown in Figs. 2 and 3. An approximate adjustment of the yoke may be obtained by pushing inwardly upon the lower end thereof, thus moving the base 19 through the opening 21 thus causing the teeth 20 to pass over the tooth 22 until the yoke 18 is brought into engagement with the tool 26. If the yoke is not binding upon the tool 26 a further adjustment may be obtained by rotating the adjusting screw 25. It should be understood that when the tool is inserted between the arm 15 and the yoke 18 the foot 21 should be spaced slightly from the arm 15. Therefore in final adjustment, when the adjusting screw 25 is rotated the foot 24 will be moved toward the arm 15 thus bringing the yoke 18 into a binding engagement with the tool 26 for firmly supporting the same in an adjusted position on the tool supporting frame.

It will be noted that the tool 26 is thus carried adjacent the emery wheel 6 as shown in Fig. 1. The tool may be tilted to bring the edge thereof into engagement with the periphery of the emery wheel and as the emery wheel rotates it is obvious the tool will be sharpened. To bring the end of the tool into correct alinement with the periphery of the emery wheel 6 it will be seen that the bar 10 is adjusted upon the upper end of the bracket 7, the inclined upper end of this bracket allowing the bar to slant upwardly at a proper angle to support the tool in engagement with the emery wheel. The arm 15 of the supporting frame may be adjusted on the bolt 17 as above specified and then finally the tool may be adjustably mounted to project through the supporting frame. The manner in which the yoke 18 is supported allows tools of various sizes and shapes to be easily supported therein to engage the emery wheel, while the connection of the tool with the frame adjacent the upper or lower end of the yoke will allow edges of different angles to be sharpened on the ends of various tools, while the bracket 7 may be moved closer to or farther away from the emery wheel 6 to allow tools of various lengths to be accommodated.

When the device is not to be used it is obvious the bar may be detached from the bracket 7 while the supporting frame may be removed from engagement with the upper end of the bar and thus the several portions in a disassembled condition may be placed in a tool box conveniently carried while occupying only a minimum amount of space. It will therefore be seen that a very efficient tool holder has been provided which will adjustably support beveled edged tools in proper position to be engaged by an emery wheel, various sized and shaped tools being efficiently supported by the frame. The simplicity of construction also minimizes the cost of production of the device and will also reduce the possibility of any of the working parts becoming out of order when the device is in use.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A tool holder of the class described comprising a bracket having clamping means, the upper end of said bracket being beveled to be inclined, a bar resting upon said bracket, means for adjustably binding the end of said bar upon said bracket, the upper end of said bar having a sleeve, a tool supporting frame including an arm having an eye, a bolt passing through said eye, and said sleeve for adjustably mounting said tool supporting frame upon the upper end of said bar.

2. A tool holder of the class described, comprising a supporting means, a supporting frame connected to said supporting means, said frame consisting of an arm having an opening extending therethrough adjacent its lower end, said arm being provided with a tooth extending into said opening, a clamping yoke having a base extending at one end provided with teeth, said base extending through the opening of said arm, a projection extending at right angles to the opposite end of said yoke and terminating in an angular foot, an adjusting screw passing through said foot and being connected to said arm, whereby a tool may be inserted between said arm and said yoke and be firmly clamped by the engagement of the yoke with said arm.

3. A tool holder of the character described, comprising a bracket having clamping means, the upper end of said bracket being beveled off to be inclined, a bar resting upon said bracket, means for adjustably binding the lower end of said bar upon said bracket, thus causing the bar to be held in an inclined position, and a tool supporting frame adjustably mounted upon the upper end of said bar and extending substantially at right angles thereto whereby the tool supporting frame will be held inclined to the perpendicular whereby tools carried thereby may be held inclined in substantial parallelism to the bar, as described.

4. A tool holder of the class described, comprising a supporting means, a tool supporting frame connected to said supporting means, said frame consisting of an arm having an opening extending therethrough adjacent its lower end, a clamping yoke having a base extending at one end provided with teeth said base extending through the opening whereby the teeth thereof can engage the arm within the opening, a projection extending at right angles to the opposite end of said yoke and terminating in an angular foot, means for connecting said foot to said arm, whereby a tool may be inserted between said arm and yoke and be firmly clamped by the engagement of the yoke with said arm.

In testimony whereof I affix my signature in presence of two witnesses.

ALPHONSO L. QUILLIN.

Witnesses:
W. A. HILTON,
ARTHUR HILTON.

Copies of this patent may be obtained for five cents each, by addressing the "Commissioner of Patents, Washington, D. C."